United States Patent [19]

Allen

[11] Patent Number: 4,709,840
[45] Date of Patent: * Dec. 1, 1987

[54] UNIVERSAL FOLDING CARRIER

[76] Inventor: Richard A. Allen, Lewis St., Lincoln, Mass. 01773

[*] Notice: The portion of the term of this patent subsequent to May 21, 2002 has been disclaimed.

[21] Appl. No.: 788,749

[22] Filed: Oct. 18, 1985

[51] Int. Cl.$^4$ ............................................. B60R 9/10
[52] U.S. Cl. ............................. 224/314; 224/42.03 B; 224/321
[58] Field of Search ............... 224/309, 314, 324, 325, 224/326, 327, 329, 42.03 B, 42.03 R, 321

[56] References Cited

U.S. PATENT DOCUMENTS

| | | | |
|---|---|---|---|
| 3,710,999 | 1/1973 | Allen | 224/42.03 B |
| 4,290,540 | 9/1981 | Allen | 224/314 |
| 4,332,337 | 6/1982 | Kosecoff | 224/42.03 B |
| 4,394,948 | 7/1983 | Graber | 224/314 |
| 4,428,516 | 1/1984 | Allen | 224/314 |
| 4,513,897 | 4/1985 | Graber | 224/314 |
| 4,518,108 | 5/1985 | Allen | 224/314 |

Primary Examiner—Henry K. Artis
Assistant Examiner—David Voorhees
Attorney, Agent, or Firm—Herbert L. Bello

[57] ABSTRACT

A universal folding carrier for carrying objects on tailgates of pickup trucks and trunk lids of automobiles or the like has a frame to which a carrying member and a supporting member are pivotally mounted for movement between collapsed and extended positions. The carrying member is held by a pair of braces in its extended position for carrying objects and the supporting member is held in its extended position by bearing against the frame. The carrying member is a substantially U-shaped member having a bent forward end defining a clamping member and a pair of rearwardly extending carrying arms. The supporting member is a substantially U-shaped member having a forward foot bar and a pair of forwardly extending legs. When the carrier is in its operative extended position, the clamping member is clamped to the tailgate of a pickup truck or it rests against the trunk lid of an automobile.

19 Claims, 6 Drawing Figures

UNIVERSAL FOLDING CARRIER

BACKGROUND OF THE INVENTION

1. Field of the Invention

The present invention relates to carriers that are configured to be attached to motor vehicles for carrying such objects as bicycles, skis, luggage and the like and, more particularly, is directed towards foldable carriers of the foregoing type which are attachable to both the tailgates of pickup trucks and the trunk lids of automobiles.

2. Description of the Prior Art

In recent years, the popularlity of bicycle riding for sport, recreation and transportation has increased. Bicycle carriers of various configurations have been designed which enable the bicycle owner to transport one or more bicycles from place to place by means of his automobile. Carriers of the type in which the weight of the bicycles is distributed on feet are shown in U.S. Pat. Nos. 3,710,999; 3,927,811; 4,290,540; 4,332,337; and 4,518,108. Sales of pickup trucks have made tremendous gains over the past few years. Prior art bicycle carriers which are designated for automobile mounting are not suited for mounting on pickup trucks. A need has arisen for a carrier of the foregoing type which can be mounted and demounted easily on pickup trucks, on vehicles with externally mounted spare tires as well as automobiles, with and without spoilers, and which can be collapsed into a flat configuration for easy shipment and storage.

SUMMARY OF THE INVENTION

It is an object of the present invention to provide a folding carrier of the type which is easily mounted on the tailgate of pickup trucks, on vehicles with externally mounted spare tires and the trunk lid of automobiles with and without spoilers. The folding carrier can be easily mounted to and demounted from the tail gate or trunk lid and folded into a relatively flat configuration for easy shipment and storage. The carrier includes a main frame to which a carrying member and a supporting member are pivotally mounted for movement between a collapsed position and an extended position. The carrying member is substantially U-shaped member having a clamping member and a pair of rearwardly extending arms and the supporting member is a substantially U-shaped member having a forward foot bar and a pair of forwardly extending legs. In one embodiment the carrying member is bent to form the clamping member which serves as a hook for holding the carrier to a tailgate and as a front foot for mounting the carrier on a trunk lid. The carrying member is held in its extended position by a pair of braces and the supporting member is held in its extended position by bearing against the main frame. Straps are provided for securing the carrier on the pickup truck or automobile in its extended position. In the extended position, the carrying member, clamping member and the supporting members are in contact with the motor vehicle.

Other objects of the present invention will in part be obvious and will in part appear hereinafter.

The invention accordingly comprises the apparatuses and systems, together with their parts, elements and interrelationships that are exemplified in the following disclosure, the scope of which will be indicated in the appended claims.

BRIEF DESCRIPTION OF THE DRAWINGS

A fuller understanding of the nature and objects of the present invention will become apparent upon consideration of the following detailed description taken in connection with the accompanying drawings, wherein.

DETAILED DESCRIPTION OF THE PREFERRED EMBODIMENTS

Figure 1:
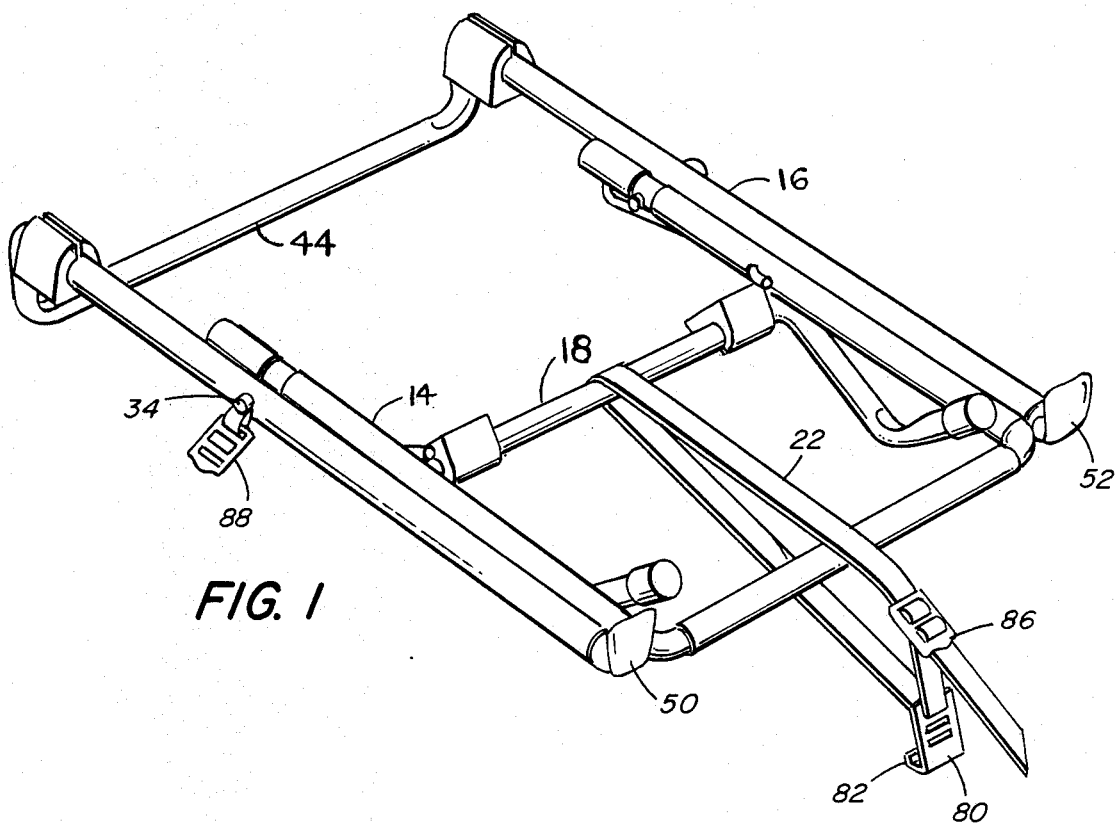
FIG. 1 is a perspective view of one embodiment of a folding carrier made in accordance with the invention, the carrier being in a collapsed or folded position.
Figure 3:
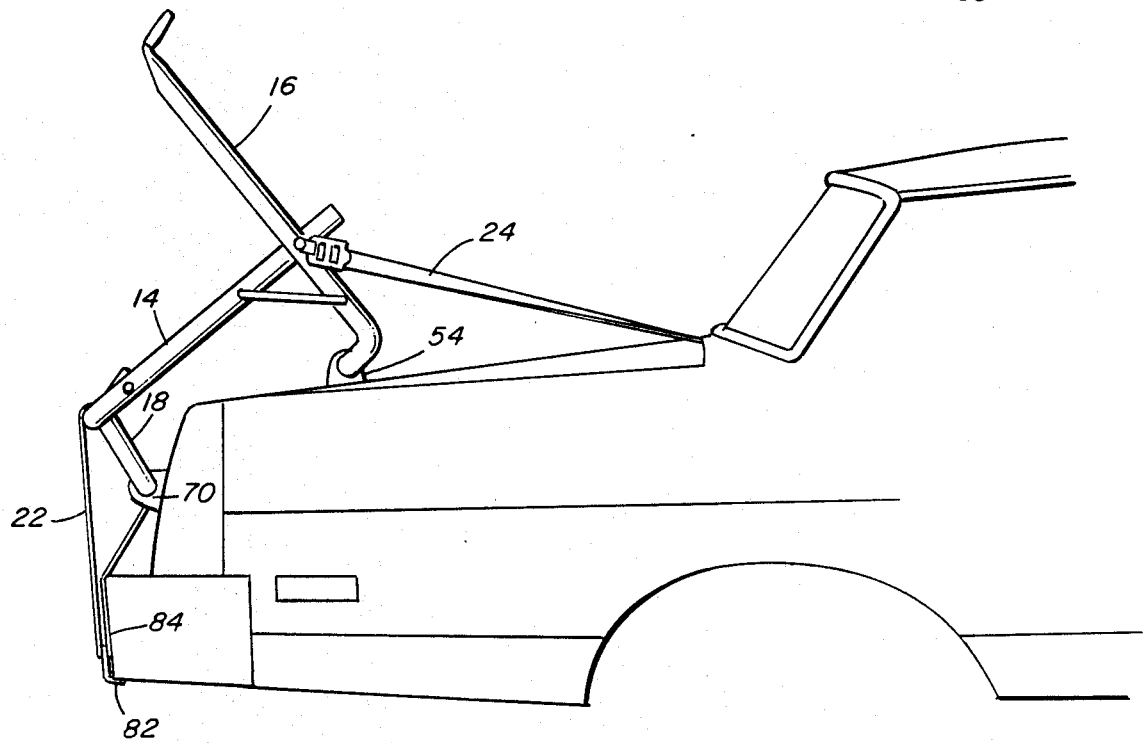
FIG. 3 is a side view of the carrier of FIG. 1 in its extended position with the front feet in the automobile mounting position, the carrier being mounted on a trunk lid.
Figure 2:
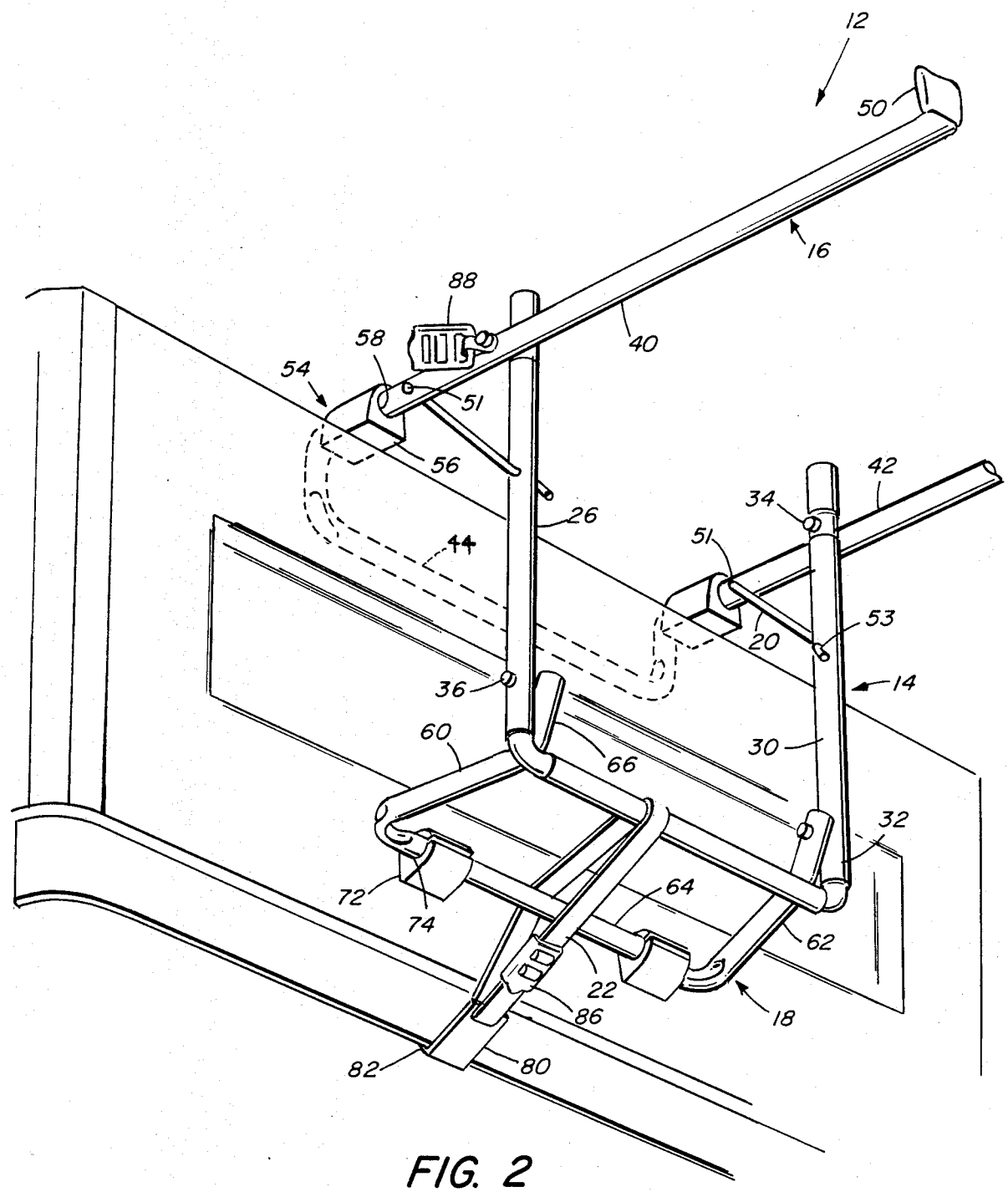
FIG. 2 is a perspective view of the carrier of FIG. 1 in its extended position with the front feet in the pickup truck mounting position, the carrier being mounted on a tailgate of a pickup truck.
Figure 4:
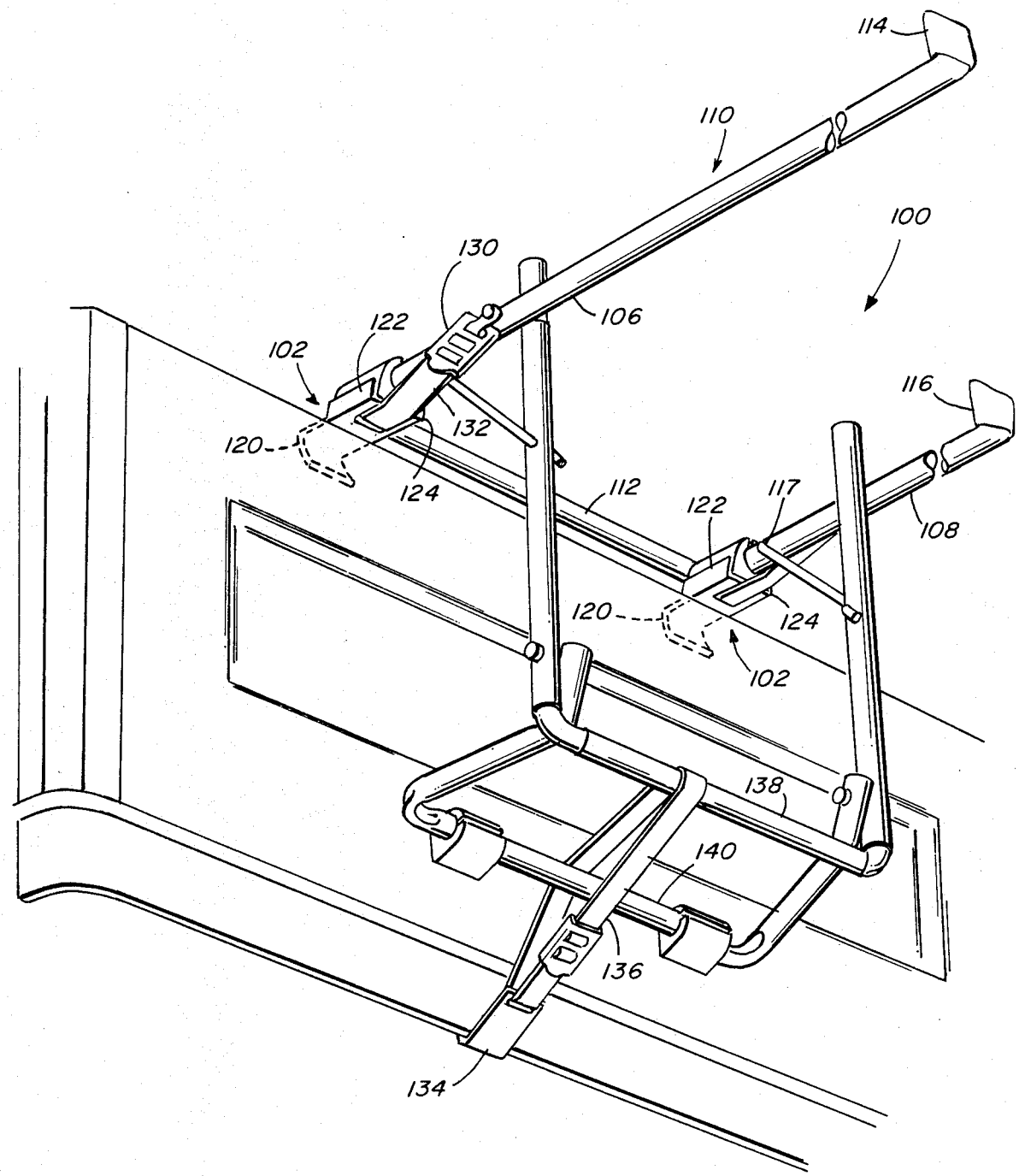
FIG. 4 is a side view of an alternate embodiment of the carrier of FIG. 1, the carrier being in its extended position and mounted on a tail gate.

Referring now to the drawings, a folding carrier 12 embodying the present invention mounted on a tailgate of a pickup truck is shown in FIG. 3 and mounted on an automobile trunk lid in FIG. 4. As hereinafter described, folding carrier 12 is movable between a flat collapsed or folded position and an erect or extended position. The flat collapsed or folded position is shown in FIG. 1 and the erect or extended position is shown in FIGS. 2, 3 and 4.

Folding carrier 12 includes a main frame 14, a carrying member 16 and a supporting member 18. A pair of bracing members 20 are provided for holding carrying member 16 at a selected angular position with respect to main frame 14. Attaching hardware such as a rear strap 22 and front straps 24 secure carrier 12 to the tailgate or trunk lid. Rear strap 22 is placed over both main frame 14 and supporting member 18. Front straps 24 are attached to opposite sides of carrying member 16. Main frame 14, a substantially U-shaped member, for example a hollow metal pipe, includes a first side leg 26, a cross member 28 and a second side leg 30. Protective covers 32 are provided on main frame 14. Carrying member 16 is pivotally mounted to an upper portion of side legs 26 and 30 by means of pins or fasteners 34, for example screws with lock nuts. Supporting member 18 is pivotally mounted to lower end of side legs 26 and 30 by means of pins or fasteners 36, for example, screws with lock nuts. Carrying member 16 is mounted on the outside of side legs 26, 30 and supporting member 18 is mounted on the inside of side legs 26, 30.

Carrying member 16, a substantially U-shaped member, for example a hollow metal pipe, includes a pair of arms 40, 42 and a front foot bar 44 which is bent downwardly to form a clamping member 44. The ends of arms 40 and 42 are bent upwardly to form stops 50 and 52. Opposite ends of braces 20, for example bent rods, are received in holes 51 and 53 formed in carrying members 40, 42 and side legs 26, 30, respectively. The ends of braces 20 which are received in holes 53 are reversely bent to hold the braces therein. The other ends of the braces 20 which are received in the holes 51 are bent greater than ninety degrees to prevent the braces from inadvertently coming out of the holes when a heavy load is being carried on the carrying arms. A suitable protective covering, such as a plastic tubing or the like, may cover all of or a portion of arms 40, 42 and stops 50 and 52. A pair of feet 54, for example resilient feet such as molded rubber members with flat bottoms 56 and a split circular portion 58, are mounted on arms 40, 42 adjacent the clamping member 44.

Supporting member 18, a substantially U-shaped member, for example a hollow metal pipe, includes a pair of legs 60, 62 and a base member or rear foot bar 64. The end portions 66 and 68 of legs 60 and 62, respectively, are bent so that the corner formed at the bend acts as a stop to hold the supporting member 18 in its extended position. Rear foot bar 64 is long enough so that it rests against side legs 26 and 30 when the supporting member 18 is in its collapsed position. The corners of base member 64 and legs 60, 62 are bent greater than ninety degrees to permit the end portions 66 and 68 to be fastened to the inside of the side legs 26 and 30. The corners of base member 64 and legs 60, 62 are bent in the manner described so as to form a rear foot bar which is sufficiently long to prevent it from passing between the side legs when the supporting member 18 is in its collapsed position. That is, the length of the rear foot bar 64 is greater than the length of cross member 28. A pair of feet 70, for example, resilient feet such as molded rubber members with flat bottoms 72 and a split circular portion 74 are mounted on base 64.

When carrier 12 is mounted on a tailgate as shown in FIG. 2, clamping member 44 is positioned behind the tailgate and arms 40, 42 rest on the tailgate. Strap 22 is threaded about both the cross member 28 and the rear foot bar 64. A clamp 80 with a clamped end 82, through which strap 22 is threaded, is attached to the bumper of the pickup truck and strap 22 is pulled tight. The tightening of strap 22 pulls carrier 12 forward and clamping member 44 is pressed against the front or inside of the tailgate. A buckle 86 is provided for tightening strap 22.

When carrier 12 is mounted on an automobile as shown in FIG. 3, feet 54 press against the trunk lid 76 and feet 70 press against the lower body panel 78. Strap 22 is threaded about both the cross member 28 and the rear foot bar 64. Strap 22 is also threaded through clamp 80 which is secured to the rear bumper 84 via hooked end 82. Each strap 24 is threaded through a buckle 88 which is secured to one fastener 34. A clamp 90 having a hooked end portion 92 is attached to each strap 24 and the hooked end is secured to the top of the trunk lid 76.

Movement of the folding carrier 12 from its extended position shown in FIG. 3 to its folded or collapsed position shown in FIG. 1 is accomplished by merely removing the ends of braces 20 from holes 51 and pivoting carrying member 16 and supporting member 18. When carrier 12 is in the extended position shown in FIGS. 1 and 3, the major part of carrying arms 40, 42 and the major part of supporting legs 60, 62 extend in opposite directions from opposite ends of frame 14 in a substantially parallel relationship to one another and in substantially perpendicular relationship to the frame. Carrying member 16 is held generally perpendicular to frame 14 when in its extended position by braces 20. The corner formed between the end portion 66 and leg 60, and the corner formed between the end portion 68 and leg 62 define stops which limit rotational movement of supporting member 18 and hold the supporting member in its extended position. The flat bottoms of the feet 54 and feet 70 distribute the weight of the bicycle over a greater area than the weight distribution provided by feet in the form of caps on the ends of the tubular members. Side legs 60, 62 and the parts of arms 40, 42 below frame 14 are sufficiently long enough to keep the bicycle pedals from hitting the tailgate and trunk lid.

When carrier 12 is in its collapsed position, frame 14, carrying member 16 and supporting member 18 are substantially in side-by-side relationship to one another. Initially, carrying member 16 is rotated counterclockwise from the extended position shown in FIG. 2 to the collapsed position shown in FIG. 1. Then, the ends of braces 20 are inserted into holes 51. It is to be noted that carrying member 16 is mounted to main frame 14 in such a manner that front foot bar 44 passes over the top of side legs 26 and 30 when carrying member 16 is rotated from its collapsed position to its extended position. That is the distance from screw 34 to front foot bar 44 is greater than the distance from screw 34 to the ends of side legs 26, 30 of frame 14. Supporting member 18 is rotated from its collapsed position (FIG. 1) to its extended position (FIG. 2) by moving it in a counterclockwise direction, the corners of legs 60 and 62 engage the corners of side legs 26, 30, thereby preventing further rotation of the supporting member. The carrying member 16 is held rigidly by braces 20 and the supporting member 18 is now braced against frame 14, thereby providing a rigid support for articles such as bicycles, for example, which are to be carried on carrying arms 40 and 42. Carrying member 16 is moved from its extended position shown in FIG. 2 to its collapsed position shown in FIG. 1 first by pulling bracing members 20 out of holes 51 and then by rotating carrying member 18 clockwise to its collapsed position. Supporting member 18 is moved to its collapsed position by merely rotating it clockwise. When the folding carrier is mounted on the automobile, the supporting member 18 is held in its extended position by the strap 22 which passes over it and the cross member 28.

Figure 5:
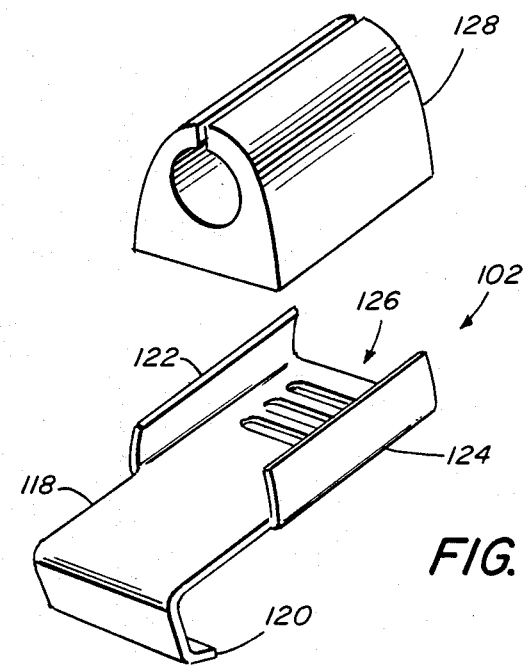
FIG. 5 is perspective view of the clamping member of FIG. 4.

Referring now to the alternate embodiment of FIGS. 4 and 5, there is shown a folding carrier 100 having a pair of clamping members 102 which are configured to engage side arms 106, 108 of a carrying member 110 and the tailgate of a pickup truck. Folding carrier 100 is similar in construction to carrier 12 with the exception of the difference between carrying members 110 and 16, respectively. Carrying member 110 is a substantially U-shaped member having side arms 106, 108 and a front foot bar 112. The free ends of arms 106 and 108 are bent upwardly to form stops 114, 116. Carrying member 110 is provided with holes 117 which corresponds with holes 51 in carrying member 16.

Each clamping member 102 has a substantially flat body 118 which terminates in a downwardly bent hook portion 120 as viewed in FIG. 5. Sides 122 and 124 of body 118, at the end opposite hook portion 120, are bent upwardly to form a substantially U-shaped channel 126 which is configured to receive a resilient foot 128. In the illustrated embodiment, by way of example, foot 128 is similar to foot 54. In an alternate embodiment, channel 126 is configured to received side arms 106 and 108.

When carrier 100 is mounted on a tailgate as shown in FIG. 4, clamping members 102 are positioned so that hook portion 120 engages the rear of the tailgate. Resilient feet 128 are positioned in channels 126 of clamping members 102 and side arms 106 and 108 are pressed into the circular openings in the resilient feet. In an alternate embodiment, side arms 106 and 108 are placed directly into channels 126. A clamp 130, which is attached to a strap 132 that is fastened to each side arm 106 and 108, is positioned behind the tailgate and tightened to snug the ends of sides 122 and 124 against the rear or outside of the tailgate. A clamp 134, which is attached to a strap 136 that is threaded about a main frame 138 and a supporting member 140 of carrier 100, is positioned to engage the rear bumper of the pickup truck. As strap 136 is tightened, carrier 100 is pulled rearwardly and hook portion 120 is pressed against the front or inside of the tailgate. Carrier 100 is now securely fastened to the tailgate. Carrier 100 is attached to a trunk lid in the manner described in connection with carrier 12.

Figure 6:
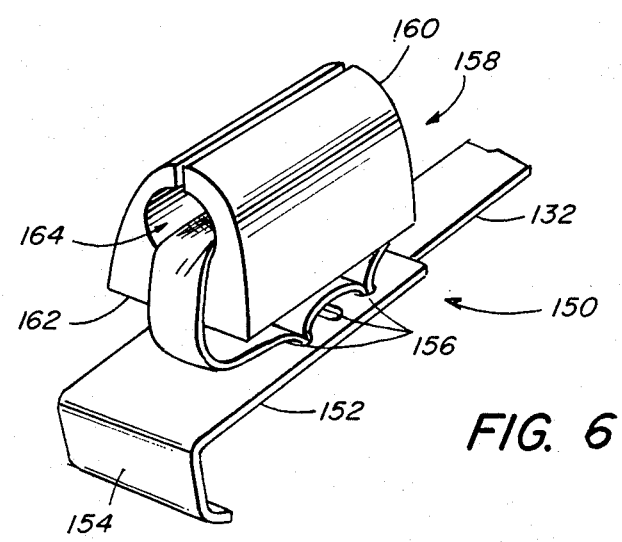
FIG. 6 is an alternate embodiment of the clamping member of FIG. 5.

In an alternate embodiment shown in FIG. 6, clamping members 102 are replaced with clamping members 150. Clamping member 150 has a substantially flat body 152 which terminates in a downwardly bent hook portion 154. A plurality of slots 156 are formed in body 152. A resilient foot 158 is provided for each clamping member 150. Resilient foot 158 has a somewhat semi-circular body 160 with a flat bottom 162 and a longitudinally extending opening 164. Each side arm 106 and 108 is pressed into opening 164 in each resilient foot to fasten the clamping member to the carrier 100. In addition, strap 132, which is attached to side arms 106 and 108 as shown in FIG. 4, is threaded though slots 156 and opening 164 to secure resilient foot 158 to clamping member 150 and the carrier. Clamping members 150 operate in the same manner as clamping members 102 secure the carrier to a tailgate.

Since certain changes may be made in the foregoing disclosure without departing from the scope of the invention herein involved, it is intended that all matter contained in the above description and depicted in the accompanying drawings be construed in an illustrative and not in a limiting sense.

What is claimed is:

1. A folding carrier mountable on a tailgate, trunk lid or the like, said carrier configured to carry objects such as bicycles and the like, said carrier comprising:
   (a) a frame;
   (b) a carrying member pivotally mounted to said frame said carrying member movable between an extended position and a collapsed position, said carrying member and said frame being in a substantially side-by-side relationship when said carrying member is in its collapsed position;
   (c) clamping means associated with said carrying member for mounting the carrier to a tailgate;
   (d) bracing means mounted to said frame and configured to engage and disengage said carrying member, said carrying member fixed in its extended position when said bracing means is in engagement with said carrying member; and
   (e) a supporting member pivotally mounted to said frame and constrained for limited rotational movement relative thereto between an extended position and a collapsed position, when said supporting member is in its extended position, a portion of said supporting member is pressed against said frame and prevents further movement of said supporting member relative to said frame said supporting member and said frame substantially in perpendicular relationship to one another when said supporting member is in its extended position, said supporting member and said frame being in a substantially side-by-side relationship when said carrying member is in its collapsed position.

2. The folding carrier as claimed in claim 1 wherein said clamping means is formed by bending said carrying member, said clamping means configured to engage a tailgate and rest on a trunk lid.

3. The folding carrier as claimed in claim 1 wherein said carrying member includes a pair of carrying arms, stop means at an end of each said carrying arm on which an object to be carried is positioned, the opposite end of each said carrying arm being bent to form said clamping means in the form of hook means for mounting the carrier to a tailgate.

4. The folding carrier as claimed in claim 1 wherein said clamping means has a hook portion and a carrier engaging portion, said hook portion configured to mount said clamping means to a tailgate, said carrier engaging portion configured to mount the carrier to said clamping means.

5. The folding carrier as claimed in claim 4 including a resilient foot, said resilient foot received in said carrier engaging portion, said carrying arms mounted to said resilient foot.

6. The folding carrier as claimed in claim 5 wherein said carrier engaging portion includes a channel formed on said clamping means, said channel configured to receive said resilient foot.

7. The folding carrier as claimed in claim 5 wherein said carrier engaging portion is a flat body formed with holding means and wherein a strap is provided for attachment to said resilient foot for securing said resilient foot to said clamping means.

8. The folding carrier as claimed in claim 1 wherein said frame means includes a first side leg, a second side leg and a cross member, said carrying member and supporting member pivotally mounted to said first and second side legs, said carrying member including a pair of arms and a front bar, one of each said arms pivotally mounted to one of each said side legs of said frame.

9. The folding carrier as claimed in claim 8 wherein each said arm is bent downwardly adjacent said front bar to form a hooked member which is configured to engage the inner surface of a tailgate when the carrier is mounted on the tailgate.

10. A folding carrier mountable on a tailgate, trunk lid or the like, said carrier configured to carry objects such as bicycles and the like, said carrier comprising:
   (a) a frame;
   (b) a supporting member pivotally mounted to said frame, said supporting member having stop means which constrains said supporting member against full rotational movement relative to said frame, said supporting member rotatable between an extended position and a collapsed position, said supporting member rotated in a first direction from said extended position to said collapsed position and in a second direction from said collapsed position to said extended position, said first direction opposite said second direction, said supporting member and said frame substantially perpendicular to one another when said supporting member is in the extended position, said supporting member and said frame being substantially in a side-by-side relationship when said supporting member is in the collapsed position;
   (c) carrying means with extending arms pivotally mounted to said frame, said carrying means movable between an extended position and a collapsed position, said carrying means and said frame are substantially in side-by-side relationship when said carrying means is in its collapsed position;

(d) clamping means for mounting said extending arms to a tailgate; and (e) bracing means mounted to said frame and configured to engage and disengage said carrying means, said carrying means and said frame in a fixed relationship when said bracing means is in engagement with said carrying means.

11. The folding carrier as claimed in claim 10 including stop means is at an end of each said extending arm on which an object to be carried is positioned, the opposite end of each said extending arm being bent to form said clamping means in the form of hook means for mounting the carrier to a tailgate.

12. The folding carrier as claimed in claim 10 wherein said clamping means has a hook portion and a carrier engaging portion, said hook portion configured to mount said clamping means to a tailgate, said carrier engaging portion configured to mount the carrier to said clamping means.

13. The folding carrier as claimed in claim 12 including resilient feet, said resilient feet received in said carrier engaging portion, said extending arms mounted to said resilient feet.

14. The folding carrier as claimed in claim 13 wherein said carrier engaging portion includes a channel formed on said clamping means, said channel configured to receive said resilient foot.

15. The folding carrier as claimed in claim 13 wherein said carrier engaging portion is a flat body formed with holding means, and wherein a strap is provided for attachment to said holding means and said resilient foot for securing said resilient foot to said clamping means.

16. The folding carrier as claimed in claim 10 wherein said frame includes a first side leg, a second side leg and a cross member, said carrying means and supporting member pivotally mounted to said first and second side legs, said carrying means extending arms being joined by a front foot bar at an end which is opposite the carrying end of said carrying means, one of each said arms pivotally mounted to one of each said side legs of said frame, said extending arms being bent adjacent said front foot bar to form said clamping means.

17. The folding carrier as claimed in claim 12 wherein each said extending arm is bent downwardly adjacent said front foot bar to form a hooked member which is configured to engage the inner surface of a tailgate when the carrier is mounted on a tailgate.

18. A folding carrier mountable on a tailgate, trunk lid or the like, said carrier configured to carry objects such as bicycles and the like, said carrier comprising:

(a) a frame;

(b) a carrying member mounted to said frame;

(c) a supporting member mounted to at least one of said frame and said carrying member, said supporting member in an extended position when mounted to one of said frame and said carrying member;

(d) means for mounting said carrying member to at least one of said supporting member and said frame, said carrying member fixed in an extended position when said mounting means is in engagement with said carrying member and frame;

(e) said carrying member and supporting member configured to rest on a trunk lid for mounting the carrier thereon; and (f) rigid clamping means having a hook portion and a carrier engaging portion associated with at least one of said carrying member, said frame and said supporting member for mounting the carrier to a tailgate.

19. The folding carrier as claimed in claim 18 wherein said hook portion is formed by bending said carrying member, said clamping means configured to engage a tailgate and rest on a trunk lid.

* * * * *

UNITED STATES PATENT AND TRADEMARK OFFICE
CERTIFICATE OF CORRECTION

PATENT NO.   : 4,709,840
DATED        : December 1, 1987
INVENTOR(S)  : Richard A. Allen It is certified that error appears in the above-identified patent and that said Letters Patent is hereby corrected as shown below:

<u>Title page,</u>
Item [*], Notice: replace "The entire wording in the Notice" with -- This patent is subject to a terminal disclaimer. --.

This certificate supercedes Certificate of Correction issued October 2, 2001.

Signed and Sealed this

Sixth Day of August, 2002

*Attest:*

*Attesting Officer*

JAMES E. ROGAN
*Director of the United States Patent and Trademark Office*